US010783909B1

(12) United States Patent
Tiller et al.

(10) Patent No.: US 10,783,909 B1
(45) Date of Patent: Sep. 22, 2020

(54) IN-PLANE GIMBAL TONGUE MICROACTUATOR SYSTEM

(71) Applicant: Seagate Technology LLC, Cupertino, CA (US)

(72) Inventors: Michael Ray Tiller, Waconia, MN (US); Jackson William Brandts, Watertown, MN (US); Gary Joe Berscheit, Watertown, MN (US); Razman Zambri, Eden Prairie, MN (US)

(73) Assignee: Seagate Technology, Fremont, CA (US)

( * ) Notice: Subject to any disclaimer, the term of this patent is extended or adjusted under 35 U.S.C. 154(b) by 0 days.

(21) Appl. No.: 16/411,866

(22) Filed: May 14, 2019

Related U.S. Application Data

(60) Provisional application No. 62/671,118, filed on May 14, 2018.

(51) Int. Cl.
*G11B 5/48* (2006.01)
*G11B 5/55* (2006.01)
*G11B 5/596* (2006.01)

(52) U.S. Cl.
CPC ............ *G11B 5/4873* (2013.01); *G11B 5/483* (2015.09); *G11B 5/4826* (2013.01); *G11B 5/4833* (2013.01); *G11B 5/4853* (2013.01); *G11B 5/5552* (2013.01); *G11B 5/596* (2013.01)

(58) Field of Classification Search
None
See application file for complete search history.

(56) References Cited

U.S. PATENT DOCUMENTS

| 7,466,520 | B2 | 12/2008 | White et al. |
| 7,538,984 | B2 | 5/2009 | Yao |
| 8,085,508 | B2 * | 12/2011 | Hatch .................. G11B 5/4833 360/245.3 |
| 8,295,012 | B1 | 10/2012 | Tian et al. |
| 8,432,643 | B1 * | 4/2013 | Lauer ..................... G11B 5/102 360/244.4 |
| 8,446,694 | B1 | 5/2013 | Tian et al. |
| 8,508,888 | B2 * | 8/2013 | Ohsawa ............... G11B 5/4833 360/234.5 |
| 8,570,688 | B1 * | 10/2013 | Hahn ................... G11B 5/4873 360/294.4 |
| 8,681,456 | B1 | 3/2014 | Miller et al. |
| 8,699,186 | B1 | 4/2014 | Hahn et al. |
| 8,861,141 | B2 | 10/2014 | Bjorstrom et al. |

(Continued)

FOREIGN PATENT DOCUMENTS

| JP | 2013251031 A * | 12/2013 | |
| WO | WO-2012011874 A1 * | 1/2012 | .......... G11B 5/4826 |

*Primary Examiner* — William J Klimowicz
(74) *Attorney, Agent, or Firm* — Hall Estill Attorneys at Law

(57) ABSTRACT

A data storage device can employ a microactuator system that efficiently translates longitudinal microactuator strain into movement in-plane with a mid-plane of a gimbal tongue. A gimbal tongue may be suspended from a load beam with a transducing head mounted to the gimbal tongue and the transducing head separated from a magnetic recording medium by an air bearing. A microactuator attached to the gimbal tongue can be positioned so that a mid-plane of the microactuator is congruent with a mid-plane of the gimbal tongue.

20 Claims, 4 Drawing Sheets

(56) References Cited

U.S. PATENT DOCUMENTS

| | | | |
|---|---|---|---|
| 8,879,210 B1 | 11/2014 | Hahn et al. | |
| 8,885,294 B2 * | 11/2014 | Kudo | G11B 5/4873 360/99.08 |
| 8,891,206 B2 | 11/2014 | Miller | |
| 8,982,513 B1 * | 3/2015 | Tian | G11B 5/4833 360/245.3 |
| 9,042,054 B2 * | 5/2015 | Bjorstrom | G11B 5/483 360/245.3 |
| 9,196,277 B2 * | 11/2015 | Omachi | G11B 5/4833 |
| 9,379,306 B2 * | 6/2016 | Motani | H01L 41/0533 |
| 9,646,638 B1 | 5/2017 | Bjorstrom et al. | |
| 9,792,936 B1 | 10/2017 | Kumar et al. | |
| 10,468,057 B2 * | 11/2019 | Naniwa | G11B 5/4833 |
| 2009/0147407 A1 * | 6/2009 | Huang | G11B 5/5552 360/294.4 |
| 2014/0168814 A1 * | 6/2014 | Kudo | G11B 5/4873 360/97.11 |

\* cited by examiner

IN-PLANE GIMBAL TONGUE MICROACTUATOR SYSTEM

RELATED APPLICATION

The present application makes a claim of domestic priority under 35 U.S.C. 119(e) to U.S. Provisional Application No. 62/671,118 filed May 14, 2018, the contents of which are hereby incorporated by reference.

SUMMARY OF THE INVENTION

In accordance with some embodiments, a data storage device has a gimbal tongue suspended from a load beam with a transducing head mounted to the gimbal tongue and the transducing head separated from a magnetic recording medium by an air bearing. A microactuator attached to the gimbal tongue is positioned so that a mid-plane of the microactuator is congruent with a mid-plane of the gimbal tongue.

DETAILED DESCRIPTION

Various embodiments are generally directed to data transducing suspensions of a data storage device that have optimized in-plane relationship of a gimbal tongue and microactuator.

In an effort to increase the data yield of a data storage device, structural and operational tolerances are decreased. For example, data bits can be closely positioned, which places less non-magnetic buffer material between adjacent data bits than in data storage devices with less data capacity. To accurately access selected data bits in data storage devices with decreased tolerances, fine resolution physical adjustments aid in maintaining data access performance. However, some fine resolution physical adjustment mechanisms can create unwanted movement and/or resonance susceptibility that jeopardizes data access performance.

Accordingly, a data storage device configured in accordance with some embodiments has a fine resolution physical adjustment mechanism that optimizes data access performance A co-located microactuator physical adjustment mechanism arranged to provide in-plane physical movement can allow a data transducing assembly to precisely articulate without degraded physical integrity or increased risk of operational variability. The ability to tune a transducing suspension for in-plane physical movement can increase the physical range of fine resolution movement and/or reduce the amount of voltage applied to articulate a transducing suspension.

Figure 1:
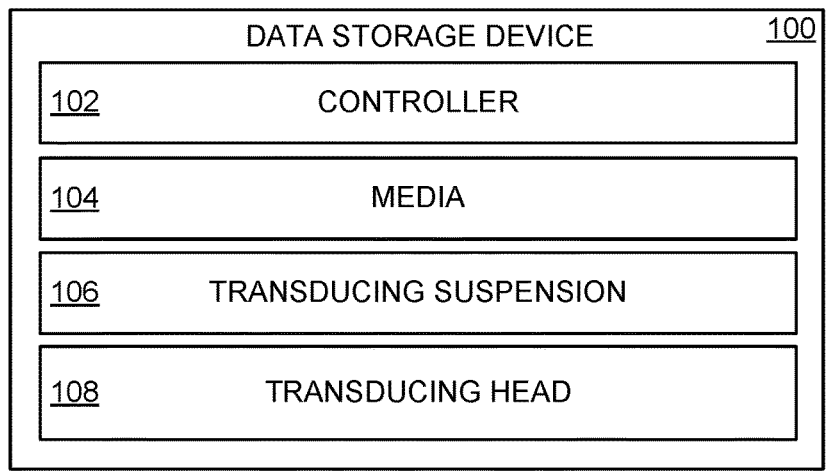
FIG. 1 is a block representation of an example data storage device in which various embodiments may be practiced.

An example data storage device 100 in which assorted embodiments of the present disclosure can be practiced is conveyed in FIG. 1. A data storage device 100 is not limited to the aspects displayed in FIG. 1, but contains at least a local controller 102, magnetic data storage media 104, transducing suspension 106, and transducing head 108 in a common housing. The local controller 102 can be any logical circuit, such as a microprocessor or programmable control circuitry, that directs data access operations to, and from, selected portions of the data storage media 104 via the transducing head 108 and transducing suspension 106.

Figure 2:
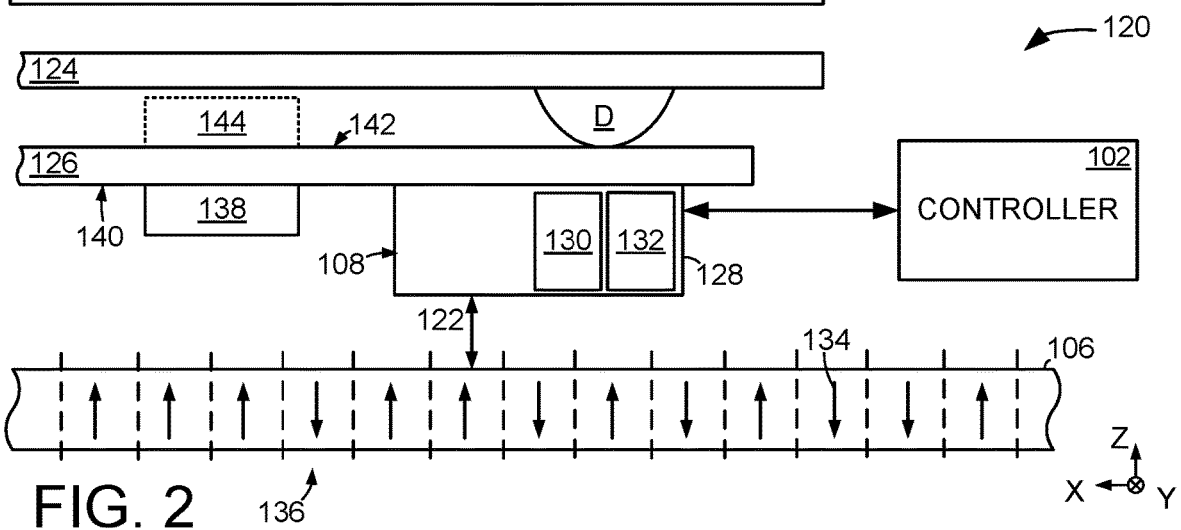
FIG. 2 displays a line representations of portions of an example data storage device arranged in accordance with some embodiments.

FIG. 2 illustrates a line representation of a portion of an example data storage device 120 arranged in accordance with some embodiments. The data storage device 120 positions the transducing head 108 to fly a predetermined air bearing distance 122 above the data storage medium 106 with the transducing suspension 106. The transducing suspension 106 can consist of at least a load beam 124 that supports a gimbal tongue 126 on which the transducing head 108 is mounted. The gimbal tongue 126 may contact a dimple (D) to allow controlled motion while flying above the spinning data storage media 106, but such configuration is not required or limiting.

As shown, the transducing head 108 can consist of a slider 128 that supports at least a data reader 130 and data writer 132. The transducing suspension 106 can respond to a local, and/or remote, controller to move in the X-Y plane to position the transducing head 108 over at least one data bit 134 located in a data track 136 of the data storage medium 106. Fine resolution physical movement of the transducing head 108 can be facilitated by one or more microactuators 138 that can be positioned on an air bearing side 140 of the gimbal tongue 126 or a load beam side 142 of the gimbal tongue, as conveyed by segmented region 144.

Figure 3A:
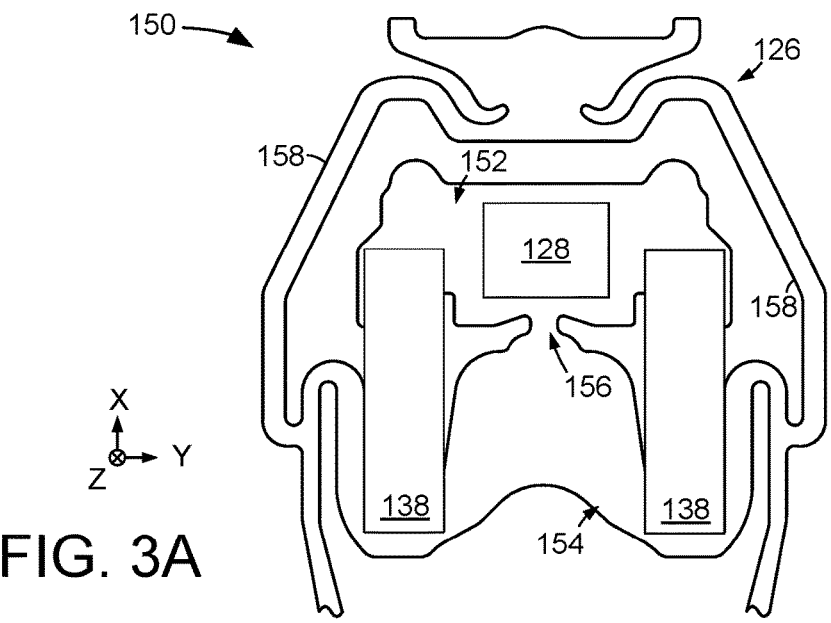
FIGS. 3A and 3B respectively show portions of an example transducing assembly configured in accordance with assorted embodiments.
Figure 3B:
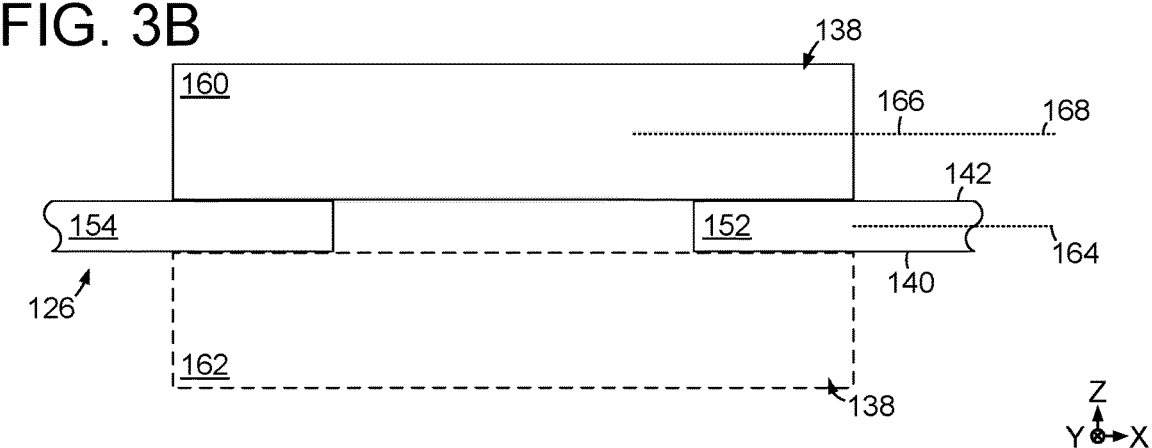

FIGS. 3A and 3B respectively depict portions of an example transducing assembly 150 that can be employed in the data storage devices 100/120 of FIGS. 1 & 2 in accordance with some embodiments. The top view line representation of FIG. 3A shows how a gimbal tongue 126 can be configured with a slider portion 152 connected to a base portion 154 via a pivot portion 156. The gimbal tongue 126 is further shaped with struts 158 that provide rigidity when a microactuator 138 is activated to induce movement of the slider portion 152 in the X-Y plane.

It is contemplated that a single microactuator 138 can be affixed to the gimbal tongue 126 to provide transducing head 108 movement in the X-Y plane about the pivot portion 156. However, control of motion with a single microactuator 138 can be difficult, which jeopardizes the operation of the transducing assembly 150, such a fly height, vibration resonance, and X-Y plane physical movement resolution. Thus, multiple separate microactuators 138 can be concurrently utilized, as shown in FIG. 3A, in a configuration that can be characterized a co-located microactuation.

Such separate microactuators 138 can provide increased physical control and data access performance than with a single microactuator 138, but can struggle to provide a range of motion in the X-Y plane that is conducive to optimal data storage performance. That is, the mechanical stroke sensitivity to applied voltage can be limited in co-located microactuation to a lateral extent in the X-Y plane that is less than the physical range possible via the configuration of the slider 152, base 154, and pivot 156 portions of the gimbal tongue 126. In other words, the slider portion 152 could physically rotate in the X-Y plane more than is allowed by the microactuators 138 due to the microactuator's 138 sensitivity to applied voltage.

While the voltage sensitivity of a microactuator 138 may be increased by utilizing highly sensitive materials in the construction of the microactuator 138, the reliability and resultant physical behavior of such highly sensitive materials can be less than ideal. Thus, various embodiments construct each microactuator 138 of reliably sensitive materials, such as perovskite that exhibits piezoelectric effects (PZT).

With reliably sensitive materials, the electrical sensitivity of a microactuator 138 cannot be appreciably heightened to increase the physical range of motion of the slider portion 152. However, the physical efficiency of a microactuator 138 can be increased, which results in greater lateral mechanical stroke and X-Y plane slider portion 152 motion per applied voltage. Although not limiting, microactuator 138 efficiency is optimized in accordance with some embodiments by increasing in-plane alignment of the microactuators 138 with the gimbal tongue 126.

FIG. 3B displays a cross-sectional line representation of a portion of the transducing assembly 150 where a microactuator 138 physically attaches the slider 152 and base 154 portions of the gimbal tongue 126. Solid region 160 conveys a microactuator 138 position on the load beam side 142 of the gimbal tongue 126 while segmented region 162 conveys a microactuator 138 position on the air bearing side 140 of the gimbal tongue 126. Positioning a microactuator 138 atop the gimbal tongue 126 results in unwanted bending motion parallel to the Z axis due to the axis of force of the microactuator 138 being out-of-plane with the gimbal tongue 126 to which it is attached.

Microactuator 138 position out-of-plane with the gimbal tongue 126 can further create unwanted sensitivity to temperature variations and twist about the X axis that can alter the gimbal tongue's 126 resonance characteristics and increase the transducing assembly's 150 susceptibility to operational variability such as vibration and shock. Accordingly, various embodiments position each microactuator 138 in alignment with the gimbal tongue 126 so that motion of the microactuator 138 is nominally in-plane with the mid-plane 164 of the gimbal tongue 126.

It is noted that various electrical connections, such as bond pads, wires, and joints, can be incorporated into the transducing assembly 150 of FIGS. 3A and 3B to allow electrical selection of the microactuators 138 that causes physical microactuator 138 and slider portion 152 movement. By positioning the longitudinal axis 166 and mid-plane 168 of the microactuator 138 in alignment with, and parallel to, the mid-plane 164 of the gimbal tongue 126, the microactuator 138 more efficiently transfers longitudinal strain to the slider portion 152 to provide higher physical transducing head 108 range in the X-Y plane without transferring mechanical moment to the slider portion 152.

Figure 4A:
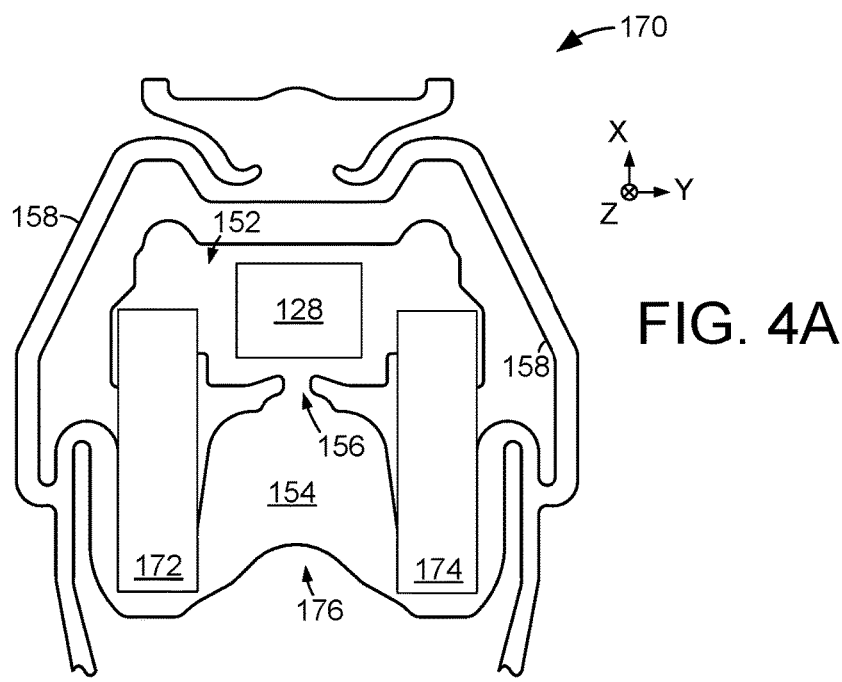
FIGS. 4A and 4B respectively illustrate portions of an example transducing suspension capable of being employed in the data storage devices of FIGS. 1 & 2.
Figure 4B:
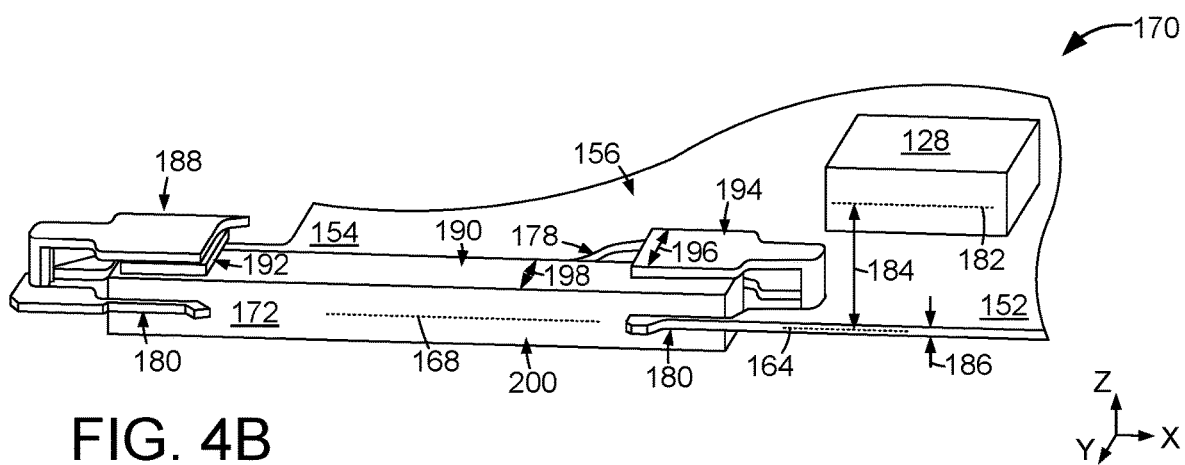

FIGS. 4A and 4B respectively illustrate aspects of an example transducing suspension 170 configured in accordance with assorted embodiments to provide in-plane microactuator and gimbal tongue applied force. FIG. 4A is a top view line representation of the transducing suspension 170 as viewed from the air bearing. The transducing suspension 170 has first 172 and second 174 microactuators that are respectively attached to the slider 152 and base 154 portions of the gimbal tongue 176 to span a pivot aperture 178 on either side of the pivot portion 156 of the gimbal tongue 176.

As opposed to the microactuators 138 of the transducing assembly 150 that are mounted atop the gimbal tongue 126, the transducing suspension 170 recesses each microactuator 172/174 into recesses 178 of the gimbal tongue 176 so that the mid-plane 168 of each microactuator 172/174 is congruent with the mid-plane 164 of the gimbal tongue 176, as illustrated in FIG. 4B. Placement of each microactuator 172/174 within the gimbal tongue 176 allows efficient translation of microactuator 172/174 force into slider portion 152 rotation while preventing unwanted yaw and movement along the Z-axis.

It is noted that the gimbal tongue recesses 178 can be any size, shape, and orientation with respect to the microactuators 172/174. However, some embodiments arrange each recess 178 with cantilevered protrusions 180 extending to contact opposite sides of the microactuators 172/174. The cantilevered protrusions 180 can be configured to apply a continuous spring force onto the microactuators 172/174, which assists in retaining the microactuators 172/174 in place as well as translating microactuator motion to the gimbal tongue 176 in-plane to provide increased mechanical stroke sensitivity to voltage applied to the respective microactuators 172/174.

The position of the microactuators 172/174 relative to the slider 128 can be tuned to provide optimal articulation resolution in the X-Y plane. For instance, the slider 128 can be affixed atop the gimbal tongue 176 so that the slider mid-plane 182 is offset from the microactuator mid-plane 168 by a predetermined distance 184, such as greater than the thickness 186 of the gimbal tongue 176. The slider-microactuator offset distance 184 operates in concert with the separation distance 188 along the X-axis to provide a lever arm that increases the mechanical stroke of the slider portion 152, and slider 128, compared to positioning the microactuators 172/174 immediately adjacent to the slider 128 atop the gimbal tongue 176.

Although not required or limiting, a retention feature 188 can continuously extend from the gimbal tongue 176 to a top surface 190 of a microactuator 172/174. The retention feature 188 may physically contact the top surface 190 or be separated from the top surface 190. The retention feature 188 can serve as support for one or more electrical connections 192, but such arrangement is not required. The configuration of the retention feature 188 can be tuned to restrict yaw and Z-axis displacement of the microactuator 172/174. For example, the feature 188 can have a paddle portion 194 that has an increased width 196 that is equal to, or greater than, the width 198 of the microactuator 172/174 to mitigate microactuator movement out-of-plane with the gimbal tongue mid-plane 164.

Figure 5:
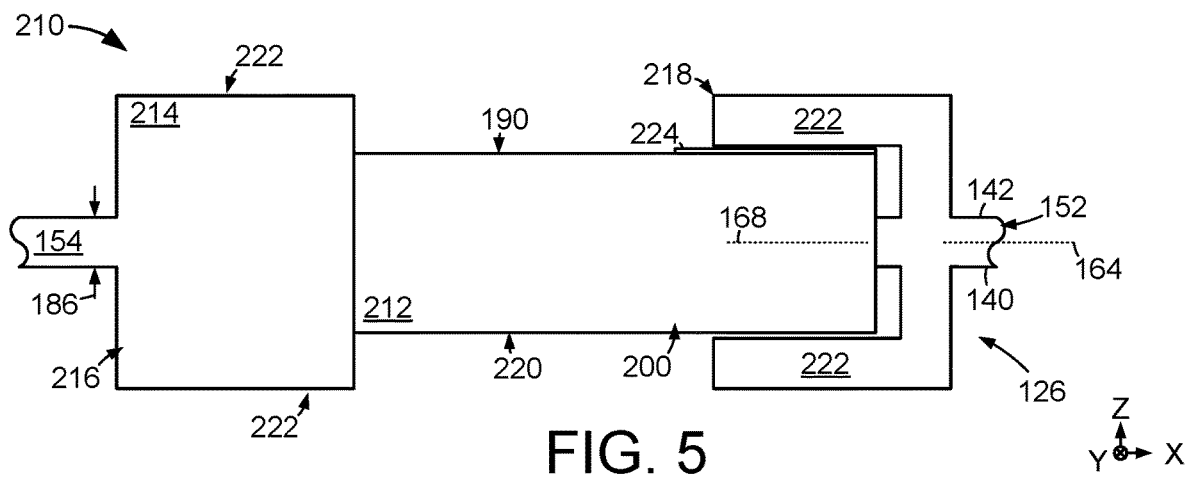
FIG. 5 displays a cross-sectional line representation of an example transducing suspension configured in accordance with various embodiments.

While supporting the microactuators 172/174 via the recess protrusions 180 contacting microactuator side surfaces 200 can efficiently translate movement to the slider 128, the yaw mode frequency of the configuration of FIG. 4B may degrade microactuator 172/174 performance. Accordingly, various embodiments increase the lateral support of the microactuators 172/174 to optimize at least the yaw mode frequency while maintaining in-plane microactuation. FIG. 5 conveys a line representation of a portion of an example transducing suspension 210 constructed in accordance with some embodiments with increased lateral microactuator 212 support.

In comparison to the recess protrusions 180 of FIG. 4B that have the same thickness as the gimbal tongue thickness 186, the microactuator 212 of the transducing suspension 210 is supported by box feature 214 that contacts the microactuators side surfaces 200 with box sides 216 having a thickness greater than the gimbal tongue thickness 186. As shown by the cutaway box feature 218, the microactuator 212 is positioned with the mid-plane 168 congruent with the gimbal tongue mid-plane 164.

The box feature 214 can be customized with a variety of different sizes, shapes, and relationship to the microactuator 212. In the non-limiting embodiment of FIG. 5, opposite ends of the microactuator 212 physically contact separate box features 214/218 that mitigate microactuator movement out-of-plane with the gimbal tongue mid-plane 164. Each box feature 214/218 continuously extends through the gimbal tongue 126 to protrude from both the air bearing 140 and load beam 142 sides of the gimbal tongue 126 to support the microactuator side surfaces 200. The top 190 and bottom 220 surfaces of the microactuator can be in physical contact with, or physically separated from, vertical limiter 222 portions of each box feature 214/218.

The vertical limiter 222 can limit yaw and Z-axis microactuator 212 movement and, in some embodiments, support an electrical connection 224, such as a bond pad or joint, to the microactuator 212. As shown, an electrical connection 224 can be physically disposed between the vertical limiter 222 and the microactuator top/bottom surface 190/220, which can promote reliable electrical interaction with the microactuator 212 despite a range of movement in the X-Y plane. It is noted that the box features 214/218 are unitary with the vertical limiters 222 physically connected to side walls 226. Such unitary box feature 214/218 construction can be more robust than the physically separate retention feature 188 of FIG. 4B, which aids in controlling unwanted out-of-plane microactuator motion as well as yaw mode frequency.

Figure 6A:
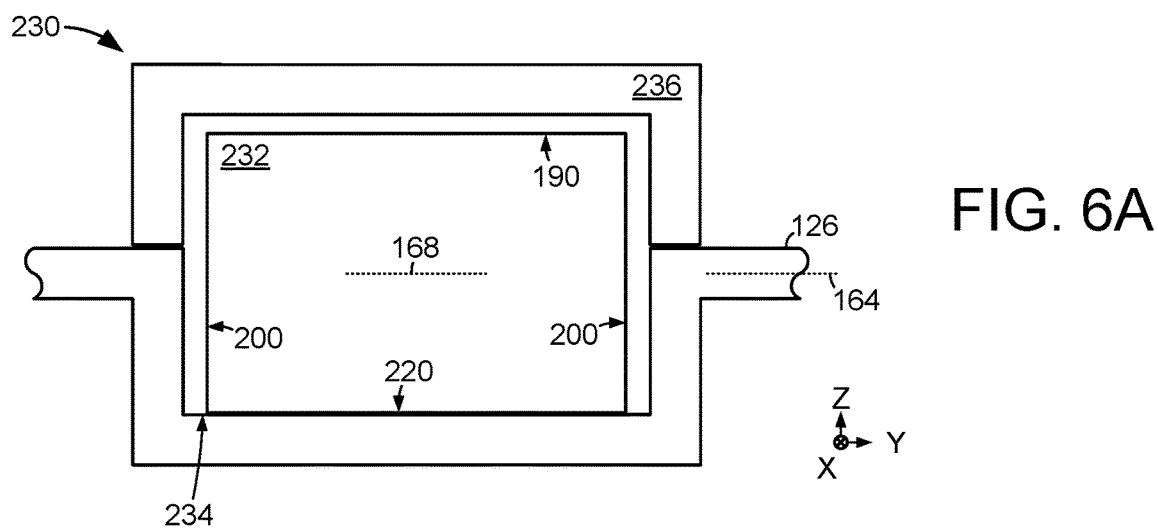
FIGS. 6A and 6B respectively depict portions of an example transducing suspension arranged in accordance with some embodiments.
Figure 6B:
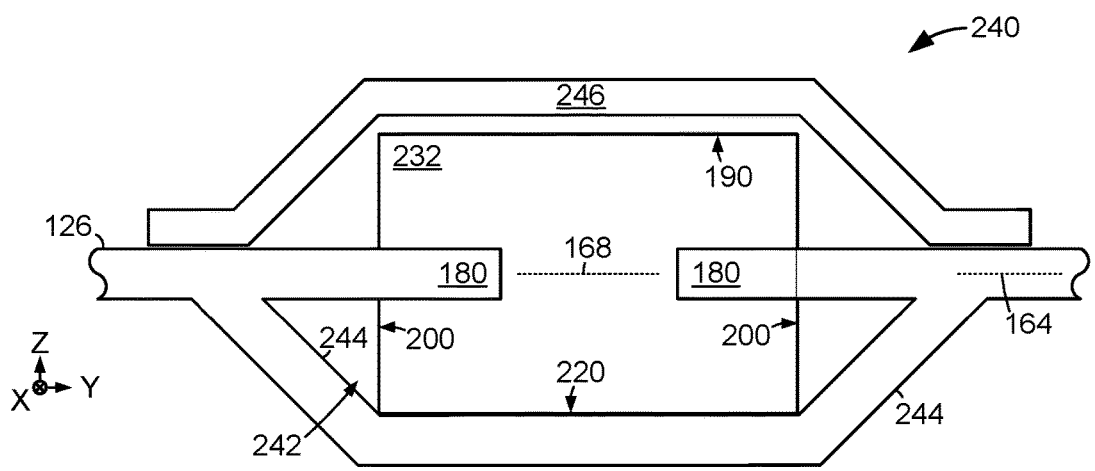

It is contemplated that a microactuator 212 can be supported in a diverse variety of manners to provide a balance of mechanical stroke sensitivity and out-of-plane motion control. FIGS. 6A and 6B respectively illustrate portions of example transducing suspensions 230 and 240 that are arranged in accordance with assorted embodiments to tune the operation of a microactuator 232. In FIG. 6A, the microactuator 232 is positioned in a recess 234 in the gimbal tongue 126 so that the bottom microactuator surface 220 contacts the gimbal tongue 126.

The side 200 and top 190 microactuator surfaces, in some embodiments, are physically separated from the gimbal tongue 126 while other embodiment continuously contact the microactuator bottom 220 and side 200 surfaces. As shown, the recess 234 is configured to align the microactuator mid-plane 168 with the gimbal tongue mid-plane 164 by continuously extending from one microactuator side surface 200 to the opposite microactuator side surface 200. The microactuator 232 can be affixed to the gimbal tongue 126 via an adhesive and/or electrical connection 192 contacting at least the bottom microactuator surface 220.

The gimbal tongue 126 corrugation defining the recess 234 can increase the stiffness of the gimbal tongue 126 while reliably mitigating out-of-plane microactuator 232 movement relative to the gimbal tongue mid-plane 164. The recess 234 may be complemented by a retention member 236 that contacts at least the top microactuator 190 surface. Whether the retention member 236 contacts the side microactuator surfaces 200 or not, the retention member 236 can decrease the yaw motion of the microactuator 232 during activation to optimize in-plane gimbal tongue 126 movement.

FIG. 6B displays an alternative gimbal tongue recess 242 where the recess sidewalls 244 are tilted at a non-normal angle, which is different than the rectangular shaped recess 234 of FIG. 6A. The recess sidewalls 244 can be configured to contact some, or none, of the side microactuator surfaces 200. The ability to select different gimbal tongue 126 recess shapes and sizes can tune microactuator movement as well as contribute the efficiency of transducing suspension 230/240 assembly. That is, the recesses 234/242 can pose different fabrication and/or assembly challenges and optimizations that are balanced with the in-plane movement and mechanical stroke sensitivity of the microactuator.

In the non-limiting embodiment of FIG. 6B, the recess 242 has gimbal tongue protrusions 180 that contact the respective microactuator side surfaces 200. The combination of bottom 190 and side 200 microactuator surface contact can increase mechanical stability compared to contact of only one microactuator surface, but can pose assembly and mechanical stroke sensitivity restrictions. As with the transducing suspension 230, a retention member 246 can be positioned atop the gimbal tongue 126 to contact at least the top microactuator surface 190 to customize microactuator 232 operation, but such construction is not required.

It is contemplated that a gimbal tongue recess 234/242 can be configured to allow increased amounts of adhesive to contact a greater amount of microactuator surface area, which can aid in high lateral microactuator deflection conditions. The gimbal tongue recess 234/242 may also be customized to decrease the temperature variations experienced by the microactuator 232. For instance, a recess 234/242 can support temperature stable adhesive, or some other material that retains temperature in a data storage environment, in contact with the microactuator 232 to maintain a relatively narrow microactuator operating temperature range, such as within 1° C., 5° C., or 10° C. of ambient temperature within a data storage device.

Figure 7:
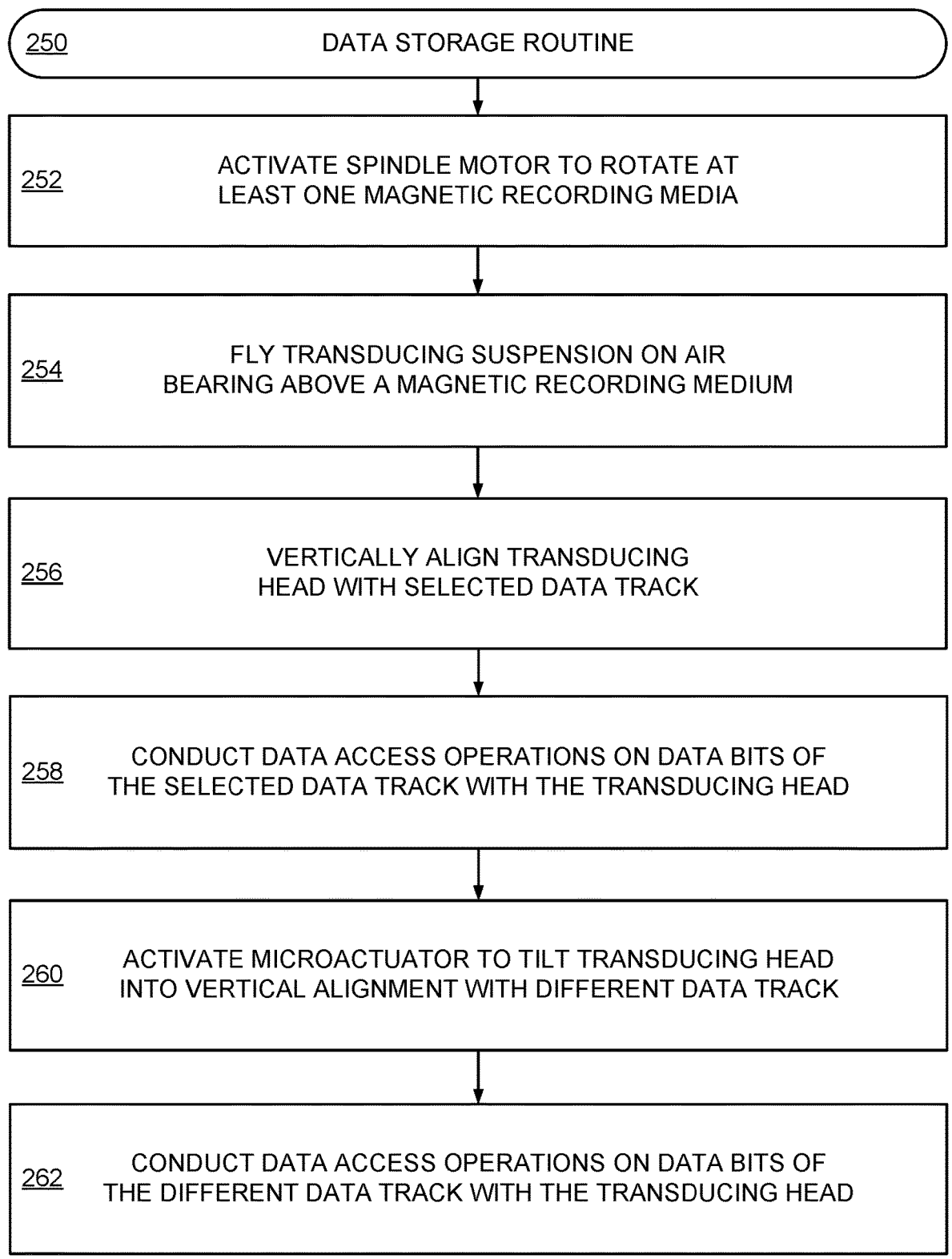
FIG. 7 provides a flowchart of an example data access routine that can be carried out by the assorted embodiments of FIGS. 1-6B.

FIG. 7 depicts an example data storage routine 250 that can be carried out with the various embodiments of FIGS. 1-6B. The data storage routine 250 can be conducted within a data storage device, such as device 100 of FIG. 1, defined by a single housing where one or more transducing suspensions are positioned proximal magnetic recording media. A local, or remote, controller of the data storage device can activate a spindle motor to being rotating the magnetic recording media in step 252.

Step 254 then generates an air bearing via the rotating magnetic recording media to allow a transducing head to fly above the media. It is noted that a transducing head, and transducing suspension, can concurrently be flying proximal different recording surfaces of one or more physically separate magnetic recording media mounted to a common spindle motor. Coarse positioning of the transducing head in step 254 allows step 256 to vertically align the transducing head with a selected data track, such as a single track radially extending about a magnetic recording medium, via articulation of the transducing suspension. It is contemplated that the head-track alignment of step 256 is conducted without activating any microactuators of the transducing suspension.

Any number of data access operations, such as data bit writes and reads, are conducted in step 258 as directed by a local controller. While data accesses to a single data track can be undertaken for relatively short, or long, periods of time, in order to access a different data track, step 260 activates at least one microactuator to tilt the slider portion of the transducing suspension to allow step 262 to access data bits on the different data track.

Due to the tuned configuration of the gimbal tongue of the transducing suspension that aligns the mid-plane of each microactuator with the mid-plane of the gimbal tongue, application of voltage to the respective microactuators corresponds with accurate lateral transducing head movement that allows the transducing head to vertically align with a different data track in step 258 without the load beam of the transducing suspension moving. Recessing the microactuator into the gimbal tongue, as opposed to placing the microactuator atop the gimbal tongue, to align the microactuator and gimbal tongue mid-planes further provides a greater mechanical stroke per applied voltage, which allows the transducing head to vertically align with increased numbers of data tracks without moving the load beam than if the microactuator produced out-of-plane force in response to activation.

Hence, the configuration of the microactuators and gimbal tongue of the transducing suspension optimizes the data storage routine 250 by reducing the number of times the load beam needs to be articulated in step 256 to conduct data access operations on a variety of different data tracks. That is, routine 250 can enjoy heightened performance by cyclically conducting steps 258-262 to access data bits on different data tracks without having to repeatedly execute load beam articulation in step 256. The increased efficiency of microactuator movement in-plane with the gimbal tongue mid-plane, compared to positioning the microactuator atop the gimbal tongue, allows the data storage device to expend less power for fine resolution transducing head movement.

Through the various embodiments of the present disclosure, co-located microactuator operation can be optimized by promoting longitudinal microactuator strain into in-plane gimbal tongue movement. By mitigating yaw and Z-axis movement of a microactuator, a transducing head can more accurately, and efficiently, tilt to access different data tracks. The mitigation of yaw mode frequency by recessing microactuators into the gimbal tongue minimizes the transfer of moment to the transducing head, which reduces off-track frequency response disturbance.

What is claimed is:

1. An apparatus comprising:
a gimbal tongue suspended from a load beam;
a transducing head mounted to the gimbal tongue, the transducing head separated from a magnetic recording medium by an air bearing; and
a microactuator attached to the gimbal tongue, a mid-plane of the microactuator congruent with a mid-plane of the gimbal tongue, the microactuator contacting a retention feature extending from the gimbal tongue to a top surface of the microactuator, the top surface separated from and parallel to the mid-plane of the microactuator.

2. The apparatus of claim 1, wherein the gimbal tongue contacts opposite sides of the microactuator with cantilevered protrusions.

3. The apparatus of claim 2, wherein each cantilevered protrusion has a longitudinal axis aligned with the mid-plane of the gimbal tongue and the mid-plane of the microactuator.

4. The apparatus of claim 2, wherein a first cantilevered protrusion and a second cantilevered protrusion each contact a single side surface of the microactuator, the single side surface oriented perpendicular to the top surface of the microactuator, the first and second cantilevered protrusions separated on the single side surface along the mid-plane of the gimbal tongue.

5. The apparatus of claim 1, wherein the mid-plane of the microactuator is oriented in alignment and parallel to the mid-plane of the gimbal tongue.

6. The apparatus of claim 1, wherein the microactuator has a first thickness, the gimbal tongue has a second thickness, the first thickness being greater than the second thickness, each thickness measured perpendicular to the mid-plane of the gimbal tongue.

7. The apparatus of claim 1, wherein the mid-plane of the microactuator is separated from a mid-plane of a slider of the transducing head by at least a distance equal to a thickness of the gimbal tongue.

8. The apparatus of claim 1, wherein the microactuator continuously extends from a first side of the gimbal tongue to a second side of the gimbal tongue.

9. The apparatus of claim 1, wherein the microactuator is configured with a rectangular shape.

10. The apparatus of claim 1, wherein the retention feature continuously extends from the gimbal tongue via a support oriented perpendicular to the mid-plane of the gimbal tongue and microactuator to contact the top surface of the microactuator.

11. The apparatus of claim 10, wherein the retention feature comprises a paddle portion oriented parallel to the mid-plane of the microactuator.

12. The apparatus of claim 11, wherein the paddle portion has a paddle width that is greater than a microactuator width of the microactuator.

13. The apparatus of claim 10, wherein the retention feature contacts the microactuator via an electrical bond pad.

14. An apparatus comprising:
a gimbal tongue suspended from a load beam;
a transducing head mounted to the gimbal tongue, the transducing head separated from a magnetic recording medium by an air bearing; and
a first microactuator attached to the gimbal tongue in a first tongue recess; and
a second microactuator attached to the gimbal tongue in a second tongue recess, each microactuator positioned with a mid-plane of the respective microactuators aligned congruent with a mid-plane of the gimbal tongue, each microactuator contacting separate retention features each extending from the gimbal tongue to respective top surfaces of the respective microactuators, each top surface separated from and parallel to the mid-plane of the respective microactuators.

15. The apparatus of claim 14, wherein each retention member forms an electrical contact with the respective microactuators.

16. The apparatus of claim 15, wherein the each tongue recess and retention member have matching shapes.

17. The apparatus of claim 15, wherein each retention member is separated from a front surface of the respective microactuators, the front surface oriented perpendicular to the top surface of the respective microactuators and first and second side surfaces of the respective microactuators.

18. A method comprising:
suspending a gimbal tongue from a load beam, the gimbal tongue attached to a transducing head separated from a magnetic recording medium by an air bearing, a microactuator attached to the gimbal tongue with a mid-plane of the microactuator congruent with a mid-plane of the gimbal tongue, the microactuator contacting a retention feature extending from the gimbal tongue to a top surface of the microactuator, the top surface separated from and parallel to the mid-plane of the microactuator;

activating the microactuator to induce movement of a slider portion of the gimbal tongue relative to a base portion of the gimbal tongue about a pivot portion of the gimbal tongue;

preventing yaw movement of the microactuator with the retention feature.

19. The method of claim 18, wherein a pair of cantilevered protrusions apply continuous spring force onto the microactuator, each cantilevered protrusion has a longitudinal axis aligned with the mid-plane of the gimbal tongue and the mid-plane of the microactuator.

20. The method of claim 19, wherein the microactuator is activated via an electrical connection provided by the retention feature.

* * * * *